Dec. 25, 1956  R. S. ELLSWORTH  2,775,050
FILE CARD STRUCTURE
Filed Sept. 12, 1955

INVENTOR.
RUSSELL S. ELLSWORTH
BY
Bauer and Seymour
ATTORNEYS

United States Patent Office 2,775,050
Patented Dec. 25, 1956

2,775,050

FILE CARD STRUCTURE

Russell S. Ellsworth, Monsey, N. Y., assignor, by mesne assignments, to Miehle Printing Press & Manufacturing Company, Chicago, Ill., a corporation of Delaware Application September 12, 1955, Serial No. 533,837

10 Claims. (Cl. 40—159)

This invention relates generally to filing devices for record material, and more particularly to devices of this character which are especially adapted for filing strips and/or individual frames of exposed photographic film.

One of the objects of the present invention is to provide a novel, relatively simple and inexpensive, card-like holder or jacket for one or more strips of exposed photographic film, such as micro-film, or for a row or rows of individual frames of such film, whereby said strips or frames may be conveniently filed, indexed, and classified in accordance with the subject matter of the exposures or images thereon.

Another object of the invention is to provide for the purpose above described, a card-like jacket or holder of novel construction wherein the various images or exposures on the film strips or frames mounted therein may be directly viewed, as well as projected upon a screen, through said jacket or holder for examining purposes.

Another object is to provide for the purpose above described, a holder or jacket in the form of a card of novel construction which is sufficiently rigid to maintain its form, possesses excellent wearing qualities and will withstand long continued use, and wherein direct finger contact and contact of dirt, dust, and other foreign or injurious particles with the film strips or frames mounted therein is completely avoided.

Still another object is to provide for the purpose above described, a novel card-like filing jacket constructed of clear, transparent plastic sheets so as to provide therein and between said sheets for the film strips and/or frames transparent longitudinal pockets defined by spaced, parallel, shoulder-forming longitudinal spacer elements which serve to hold said sheets in spaced face to face relation and to confine and maintain said film strips or frames within said pockets, the pockets being completely closed at the front and back thereof and access thereto for inserting the film strips or frames therein and removing the same therefrom being had through longitudinal slits formed in one of said sheets and which are located exteriorly of said pockets and directly over said spacer elements, thus eliminating any possibility of accidental displacement of the film strips or frames from the pocket through handling of the jacket.

The above and further objects and novel features of the present invention will more fully appear from the following detailed description when the same is read in connection with the accompanying drawing. It is to be expressly understood, however, that the drawing is for the purpose of illustration only and is not intended as a definition of the limits of the invention.

In the drawing, wherein like reference characters refer to like parts throughout the several views, Fig. 1 is a front or face elevational view of one form of filing jacket or holder constructed in accordance with the present invention and adapted for mounting three strips of photographic negative film therein;

Figure 1:
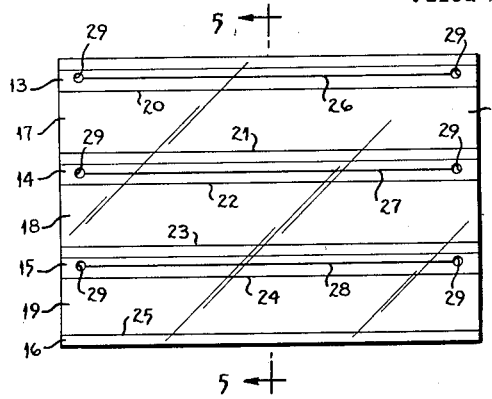
Figure 2:
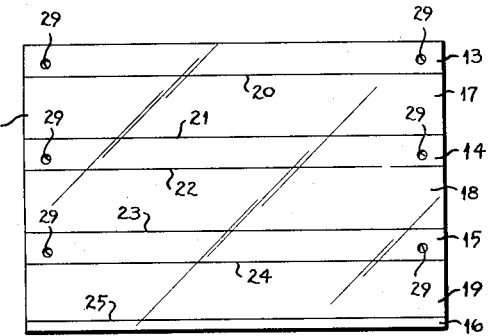
Fig. 2 is a rear elevational view of said jacket or holder.

Referring to the drawing, there is shown, by way of example, one form of filing jacket or holder constructed in accordance with the present invention, which is particularly designed for use in mounting one or more strips of photographic negative film, such as micro-film, containing several successive exposures or images, or one or more rows of individual frames of such film. It will be understood that the novel jacket or holder may be made in any desired size to accommodate any size and type of commercially available film. In the illustrated embodiment, the novel jacket or holder is of a size which will enable filing of the same in standard conventional office card files, and is constructed to accommodate three strips of micro-film of the 16 mm. size, or the equivalent thereof in individual frames of such film. Obviously, the novel jacket or holder may be constructed to receive only one strip of micro-film of the available sizes, or the size of said jacket may be varied as desired to accommodate any desired number and length of strips of such film in the available sizes. It will be apparent as the following detailed description of the novel jacket or holder proceeds, that the present invention may also be advantageously embodied in protective mountings for stamps, photographs, and other like objects of value and interest which are to be preserved.

Figure 5:
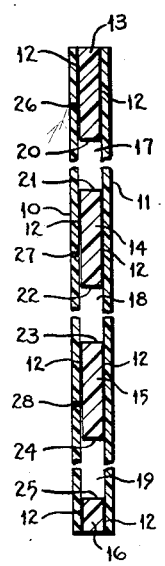
Fig. 5 is a vertical transverse sectional view on the line 5—5 of Fig. 1, on an enlarged exaggerated scale.

As shown in the drawing, the novel jacket or holder comprises a rectangular front sheet or panel 10 and a rectangular back sheet or panel 11. The sheets 10 and 11 are of the same length, width and thickness, and they are formed of clear, transparent, rigid thermoplastic material such as, for example, cellulose acetate, rigid vinyls, or polyester film of the type known as Mylar (made by E. I. du Pont de Nemours & Co.). The sheets 10 and 11 are disposed in superposed face to face relation with their edges accurately aligned, and they are firmly bonded in such relation and position by an adhesive 12 to the top and bottom planar surfaces, respectively, of four flat and relatively narrow spacer elements 13, 14, 15 and 16 interposed between said sheets. These spacer elements 13, 14, 15 and 16 are all of the same thickness, and they are preferably formed of the same rigid thermoplastic material as that of the sheets 10 and 11. The thermoplastic material forming the spacer elements 13, 14, 15 and 16 is preferably, but not necessarily, of opaque or translucent character so that said elements will be well-defined and may be readily seen through the transparent sheets 10 and 11. The adhesive 12 preferably consists mainly of a solvent for the thermoplastic material so that the overall thickness of the jacket or holder is not increased to any noticeable extent, and that said overall thickness is substantially that of the combined thicknesses of the sheets 10 and 11 and one of the spacer elements 13, 14, 15 and 16. In Fig. 5 of the drawing, the adhesive 12 is exaggerated for the purpose of illustration, as only a very thin, film-like coating thereof is actually present between the sheets 10 and 11 and spacer elements 13, 14, 15 and 16.

As shown, the spacer elements 13, 14, 15 and 16 extend the entire length of the sheets or panels 10 and 11 in parallel relation to each other and to the upper and lower longitudinal edges of said sheets. The spacer elements 13, 14, 15 and 16 serve to maintain the sheets 10 and 11 spaced apart a distance equal to the thickness of said elements. The spacer elements 13 and 16 are located flush with the upper and lower longitudinal edges, respectively, of the sheets 10 and 11, the spacer element 16 being of less width than the spacer elements 13, 14 and 15 so as to advantageously reduce the width of the jacket or holder to a desired minimum and at the same time conserve material since a wider spacer element at the bottom of said jacket or holder is not necessary or essential for any purpose. The spacer elements 14 and 15 are so located that they are spaced from each other and from the spacer elements 13 and 16, respectively, a distance which is governed by the size or width of the film strip or film frame inserts which are to be mounted in the jacket or holder, said distance being large enough to accommodate completely said inserts between adjacent elements 13 and 14, 14 and 15, and 15 and 16. For example, in the case of film strip or film frame inserts of 16 mm. micro-film which is usually .625 of an inch wide, the distance between adjacent spacer elements 13 and 14, 14 and 15, and 15 and 16 may be .625 of an inch, plus a designed clearance of approximately .062 of an inch, said distance thus being approximately .687 of an inch which is deemed sufficient for said size of film.

It will be apparent that the spacer elements 13, 14, 15 and 16 in conjunction with the transparent sheets or panels 10 and 11 form in the pocket or holder three transparent, protective, longitudinal pockets 17, 18 and 19 for the film strip and/or film frame inserts, said pockets being open at their opposite ends and being completely closed at the front and back thereof. It will also be apparent that the opposing longitudinal edges of the spacer elements 13, 14, 15 and 16 present shoulders 20, 21, 22, 23, 24 and 25 which are perpendicular to the plane of the jacket or holder and, hence, they operate to confine the film strip and/or film frame inserts within the pockets 17, 18 and 19 and against relative vertical displacement. It has been found that transparent thermoplastic sheets 10 and 11 having a thickness of approximately 0.0075 inch, and thermoplastic spacer elements 13, 14, 15 and 16 having a thickness of approximately 0.020 inch, the usual thickness of micro-film being about 0.006 inch, will effectively produce the desired jacket or holder which is relatively thin, is moisture proof, is strong and durable, will not curl and is resistant to bending. It is to be understood that these dimensions are not critical and may be varied as desired.

Figure 3:
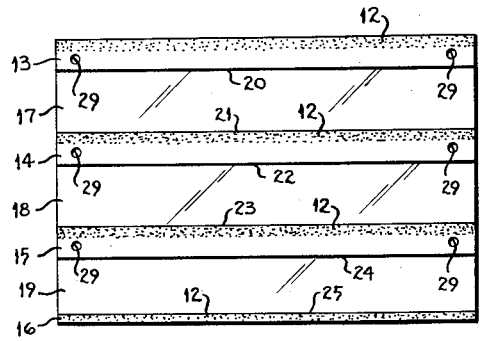
Fig. 3 is a view similar to Fig. 1, but with the front or face sheet removed.
Figure 4:
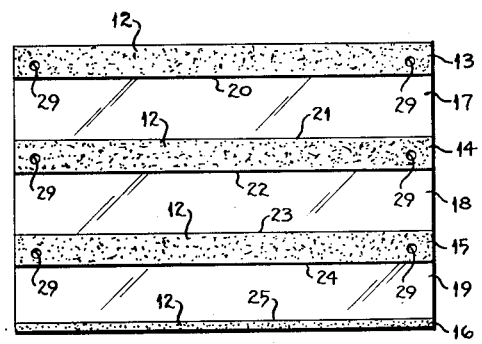
Fig. 4 is a view similar to Fig. 2, but with the rear sheet removed.

It is important to note, as shown in Figs. 3, 4 and 5, that in bonding the sheets 10 and 11 and spacer elements 13, 14, 15 and 16 permanently together as a single unit to produce the jacket or holder, the adhesive 12 is, in accordance with another aspect of the present invention, applied such that it completely covers the undersurfaces of the elements 13, 14, 15 and 16 and also the upper surface of the element 16, and extends to and along the entire length of the longitudinal edges of said elements, and that said adhesive completely covers substantially the upper half only of the upper surfaces of the elements 13, 14 and 15 and extends to and along the entire length of the upper longitudinal edges of said latter elements. In this manner, it is positively assured that the film strip and/or film frame inserts within the pockets 17, 18 and 19 cannot slide upwardly or downwardly between the spacer elements 13, 14, 15 and 16 and the back sheet 11 to conceal a portion or portions of said inserts, and said inserts cannot slide downwardly between said elements and the front sheet 10 to likewise conceal a portion or portions of said inserts. Whereas, the unbonded lower halves of the upper surfaces of the spacer elements 13, 14 and 15, with a slight frontward displacement of the portions of the front sheet 10 adjacent said elements, advantageously provides for upward sliding movement of the film strip and/or film frame inserts from the pockets 17, 18 and 19 between said spacer elements and said front sheet, and downward sliding movement of said inserts into said pockets, for a purpose to be presently described, said upward sliding movement of the inserts being normally prevented by the shoulders 20, 22 and 24.

Although the film strip and/or film frame inserts may be lengthwise inserted into and removed from the pockets 17, 18 and 19 through either open end of the latter, this procedure is difficult and requires utmost patience and is time consuming. In order to materially facilitate and expedite the insertion and removal of the film strip and/or film frame inserts from the pockets 17, 18 and 19, the jacket or holder is, in accordance with another aspect of the present invention, provided with longitudinal slits 26, 27 and 28 which, as shown in Figs. 1 and 5, are formed in the front sheet 10 and located above the shoulders 20, 22 and 24, respectively, and directly over the unbonded lower halves of the spacer elements 13, 14 and 15, respectively. These slits 26, 27 and 28 terminate a short distance inwardly from the opposite side edges of the front sheet 10. Thus, the film strip and/or film frame inserts may be easily and quickly inserted into the pockets 17, 18 and 19 by slightly displacing frontwardly the portions of the front sheet 10 below the slits 26, 27 and 28 and sliding said inserts downwardly edgewise and widthwise through said slits and over the unbonded lower halves of the spacer elements 13, 14 and 15 into the pockets 17, 18 and 19, respectively. Likewise, the inserted film strip and/or film frame inserts may be easily and quickly removed from the pockets 17, 18 and 19 by slightly displacing frontwardly the portions of the front sheet 10 below the slits 26, 27 and 28, lifting said inserts above the shoulders 20, 22 and 24, and then sliding the same upwardly edgewise and widthwise over the unbonded lower halves of the spacer elements 13, 14 and 15 and out through the slits 26, 27 and 28. To prevent tearing of the thermoplastic material forming the front sheet 10 through to the side edges of said sheet upon frontward displacement of the portions thereof below the slits 26, 27 and 28, holes 29 are formed in the front sheet 10 at the opposite ends of said slits. In the illustrated embodiment, the holes 29 also pass through the spacer elements 13, 14 and 15 and the back sheet 11 to facilitate manufacture of the jacket or holder, but need only to be formed in the front sheet 10 for the purpose described.

It is to be noted that since the slits 26, 27 and 28 are merely fine-line incisions in the front sheet 10, and being that they are located above the respective pockets 17, 18 and 19, dirt, dust, moisture and other foreign particles cannot readily enter said pockets through said slits to injure the film strip and/or film frame inserts and form a cloud thereon or on the inner surfaces of the front and back sheets 10 and 11, respectively. Additionally, the slits 26, 27 and 28 maintain the smooth continuous outer surface of the front sheet 10, whereby the jackets or holders when handled or processed in their index files will readily slide over one another without catching.

In the making of the described jacket or holder, the slits 26, 27 and 28 are preferably formed in the front sheet 10 after said sheet, the spacer elements 13, 14, 15 and 16 and the back sheet 11 are assembled in the described relation and bonded together, whereby said slits are properly located and the spacer elements 13, 14 and 15 effectively serve as a backing or anvil in cutting the slits in the front sheet 10 with a razor-sharp knife.

There is thus provided a novelly constructed, simple and inexpensive card-like filing jacket or holder which provides several transparent, protective jackets for photographic film, such as micro-film, whereby strips, as well as individual frames, of such film may be easily and conveniently filed, indexed, classified, sorted, and otherwise handled. The film strip or frames may be projected and magnified on a screen for viewing and examining purposes, and enlargements may be made therefrom, without having to remove the same from the jacket. The film strips or frames are fully protected against direct finger contact, and against dirt, dust, moisture, and any abrasive action thereon which might damage or injure the same.

Although only one embodiment of the invention has been described in the foregoing specification and illustrated in the accompanying drawing, it is to be understood that the same is not limited to said embodiment. Various changes may be made in the structure without departing from the spirit and scope of the invention, as will now be clear to those skilled in the art. For example, when the novel jacket or holder is to be used in connection with photographs, stamps, or other opaque inserts, the back sheet or panel 11 need not be made of transparent material. Also, the novel jacket or holder may have only one pocket or any number of pockets therein depending on the size of the film or other insert and on the size of said jacket or holder.

What is claimed is:

1. A card-like filing jacket for strips and/or individual frames of photographic film and the like, comprising two rectangular sheets arranged in superposed relation, a narrow width spacer element interposed between said sheets and extending lengthwise thereof parallel to the longitudinal edges of said sheets, and another narrow width spacer element interposed between said sheets and extending lengthwise thereof parallel to said first-named spaced element, said spacer elements being spaced apart a distance somewhat greater than the width of the film strip and/or film frame insert so as to receive therebetween completely said film insert, said sheets being adhesively secured to the top and bottom planar surfaces, respectively, of one of said spacer elements at least at and along the entire length of the longitudinal edge thereof facing the other of said spacer elements, one of said sheets being adhesively secured to one of the planar surfaces of the other of said spacer elements at least at and along the entire length of the longitudinal edge thereof facing the said one of said spacer elements, the other of said sheets being adhesively secured to the other of the planar surfaces of the said other of said spacer elements only at and along the entire length of the longitudinal edge thereof facing away from the said one of said spacer elements leaving the remainder of the said other of the planar surfaces free from the said other of said sheets, the said other of said sheets having a slit therethrough extending lengthwise thereof and located directly over the said remainder of the said other of the planar surfaces, said slit providing an entrance opening through which the film insert may be edgewise inserted over the said other of said spacer elements between said sheets and positioned between said spacer elements.

2. A filing jacket as defined in claim 1 wherein said sheets are of the same length and width and arranged with their edges aligned, the said one of said spacer elements is located even with the lower longitudinal edges of said sheets, and the said other of said spacer elements is located even with the upper longitudinal edges of said sheets, and comprising at least two additional narrow width spacer elements interposed between said sheets and extending lengthwise thereof parallel to and between the spacer elements at the top and bottom of said sheets, said additional spacer elements being located such that the space between the spacer elements at the top and bottom of said sheets is divided into three spaces of alike width to receive completely the film inserts, said additional spacer elements being adhesively secured to one of said sheets at least at and along the entire length of the opposite longitudinal edges thereof and being adhesively secured to the other of said sheets only at and along the longitudinal edges thereof facing the spacer element at the top of said sheets, and slits in the said other of said sheets extending therethrough and lengthwise thereof and located directly over the adjacent non-adhering longitudinal portions of said additional spacer elements.

3. A filing jacket as defined in claim 1 wherein the material forming at least one of said sheets is transparent.

4. A filing jacket as defined in claim 1 wherein the slit in the said other of said sheets extends substantially the entire length of said sheet and terminates at opposite ends thereof into round openings in said sheet, whereby tearing of the material of said sheet is avoided.

5. A filing jacket as defined in claim 1 wherein said sheets and said spacer elements are formed of thermoplastic material.

6. A filing jacket as defined in claim 5 wherein said thermoplastic material for said sheets is transparent.

7. A filing jacket as defined in claim 5 wherein said thermoplastic material for said sheets is of a thickness on the order of 0.0075 inch, and said thermoplastic material for said spacer elements is of a thickness on the order of 0.020 inch.

8. A filing jacket as defined in claim 5 wherein the adhesive securing said sheets and said spacer elements together consists mainly of a solvent for said thermoplastic material, whereby the overall thickness of the filing jacket is not increased by said adhesive any noticeable extent.

9. A filing jacket as defined in claim 1 wherein said sheets are adhesively secured to the entire top and bottom planar surfaces, respectively, of the said one of said spacer elements, the said one of said sheets is adhesively secured to the entire planar surface adjacent thereto of the said other of said spacer elements, and the said other of said sheets is adhesively secured to the adjacent planar surface of the said other of said spacer elements only from the longitudinal edge thereof facing away from the said one of said spacer elements to a point substantially midway between said edge and the opposite longitudinal edge of the said other of said spacer elements.

10. A card-like filing jacket for strips and/or individual frames of photographic film and the like, comprising two rectangular sheets arranged in superposed relation, spacer means arranged between said sheets to hold the same in spaced relation, said spacer means comprising at least two narrow width elements extending lengthwise of said sheets parallel to each other and to the longitudinal edges of said sheets, said elements being spaced apart a distance somewhat greater than the width of the film strip and/or film frame insert so as to receive therebetween completely said film insert, said sheets being adhesively secured to the top and bottom planar surfaces, respectively, of one of said elements at least at and along the length of the longitudinal edge thereof facing the other of said elements, one of said sheets being adhesively secured to the adjacent planar surface of the said other of said elements at least at and along the length of the longitudinal edge thereof facing the said one of said elements, and the other of said sheets having a slit therethrough extending lengthwise thereof and located directly over the said other of said elements intermediate the longitudinal edges thereof, said slit providing an entrance opening through which the film insert may be edgewise inserted over the said other of said elements between said sheets and into position between said elements.

References Cited in the file of this patent

UNITED STATES PATENTS

| | | |
|---|---|---|
| 522,484 | Odgers | July 3, 1894 |
| 1,320,683 | Goodhue | Nov. 4, 1919 |
| 2,477,886 | McCaskill | Aug. 2, 1949 |